US008082462B1

United States Patent
Tidwell

(10) Patent No.: US 8,082,462 B1
(45) Date of Patent: Dec. 20, 2011

(54) DIRECT SYNTHESIS OF AUDIO CLOCK FROM A VIDEO CLOCK VIA PHASE INTERPOLATION OF A DITHERED PULSE

(75) Inventor: Reed P. Tidwell, Centerville, UT (US)

(73) Assignee: Xilinx, Inc., San Jose, CA (US)

( * ) Notice: Subject to any disclaimer, the term of this patent is extended or adjusted under 35 U.S.C. 154(b) by 648 days.

(21) Appl. No.: 12/270,131

(22) Filed: Nov. 13, 2008

(51) Int. Cl.
G06F 1/12 (2006.01)
G06F 13/42 (2006.01)
H04L 5/00 (2006.01)
H04L 7/00 (2006.01)

(52) U.S. Cl. ........ 713/401; 713/400; 713/500; 713/501; 713/600

(58) Field of Classification Search .................. 713/400, 713/401, 500, 501, 600
See application file for complete search history.

(56) References Cited

U.S. PATENT DOCUMENTS

| | | | |
|---|---|---|---|
| 5,528,308 A | 6/1996 | Alelyunas et al. | |
| 6,693,468 B2 * | 2/2004 | Humphreys et al. | 327/105 |
| 6,779,010 B2 * | 8/2004 | Humphreys et al. | 708/490 |
| 7,541,880 B2 * | 6/2009 | Galloway et al. | 331/16 |
| 7,800,451 B2 * | 9/2010 | Fu et al. | 331/4 |
| 7,826,582 B2 * | 11/2010 | Kuhns et al. | 375/375 |
| 2008/0122977 A1 | 5/2008 | Miyamoto | |
| 2008/0129557 A1 * | 6/2008 | Kong | 341/61 |
| 2008/0258835 A1 * | 10/2008 | Galloway et al. | 332/127 |
| 2010/0045395 A1 * | 2/2010 | Fu et al. | 331/179 |

OTHER PUBLICATIONS

Roth, Eric Pascal; All-Digital Standard-Cell Based Audio Clock Synthesis; Chapter 4: Phase Shift DCO; Diss. ETH No. 15667; 2004; A Dissertation submitted to the Swiss Federal Institute of Technology Zurich; pp. 49-74.
Gennum; GS4901B/GS4900B; SD Clock and Timing Generator with Genlock; Data Sheet for an ASSP chip; Nov. 2007; pp. 1-2 and 52-56.

* cited by examiner

*Primary Examiner* — Thomas Lee
*Assistant Examiner* — Jaweed A Abbaszadeh
(74) *Attorney, Agent, or Firm* — Steven H. Slater; Lois D. Cartier

(57) ABSTRACT

An embodiment of the invention relates to a clock signal generator and a related method to produce a clock signal that is a rational but non-integer submultiple of a reference clock signal by employing a dithered pulse signal and a fractional phase signal. The rational submultiple includes an integer part and a fractional part, the fractional part including a numerator and a denominator. A dithered pulse generator is configured to produce the dithered pulse signal from a count of the reference clock signal that is reset dependent on the integer part, and a fractional phase signal from a count that is incremented by the numerator and that is reset dependent on the denominator. A phase controller is configured to delay the dithered pulse with a delay proportional to the fractional phase to produce the output clock signal. The delay may be calibrated by internal logic.

22 Claims, 4 Drawing Sheets

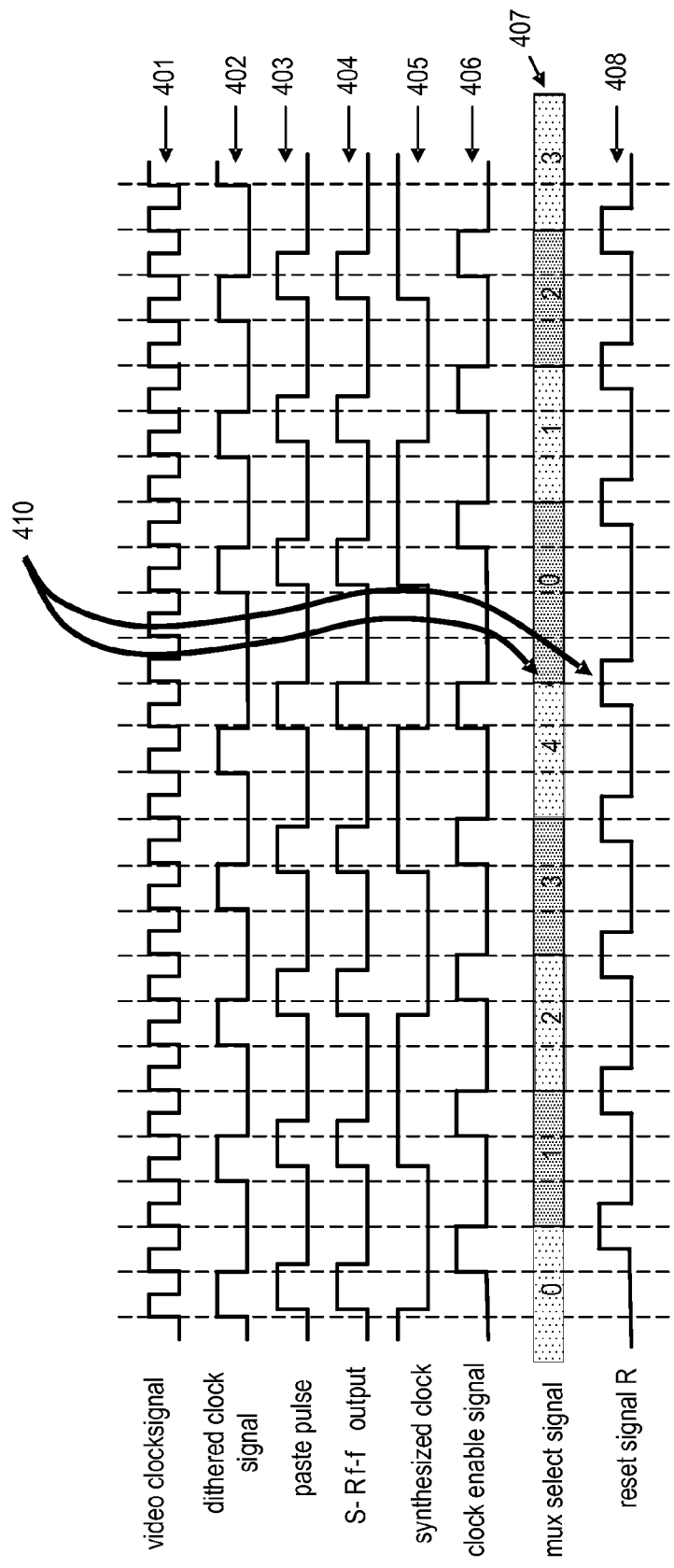

DIRECT SYNTHESIS OF AUDIO CLOCK FROM A VIDEO CLOCK VIA PHASE INTERPOLATION OF A DITHERED PULSE

FIELD OF INVENTION

An embodiment of the invention relates generally to clock signal generation and methods, and more particularly to producing a clock signal that is a rational but non-integer submultiple of an input clock signal.

BACKGROUND

When audio samples are de-embedded from a video stream, the timing of the audio samples must be reconstructed. Usually the audio samples are synchronous with the video timing. There is generally a precise ratio of the audio sampling frequency with respect to the video sampling frequency. To transmit the audio signal via a serial interface (e.g., an AES/EBU (Audio Engineering Society/European Broadcasting Union), SPDIF (Sony/Philips Digital Interconnect Format), or an I2S (Inter-IC Sound, or Integrated Interchip Sound) interface), an audio clock signal at a submultiple of the higher signal sampling rate, such as a video sampling rate, is required (e.g., a video sample rate that is 128 times an audio sampling rate). Several techniques are conventionally used to generate the required synchronous audio clock signal from a higher frequency video clock signal. Most involve using well-known phase-locked loop techniques incorporating a VCO ("voltage-controlled oscillator") to generate the audio clock signal.

A conventional way to generate a synchronized audio clock signal from a higher frequency video clock signal employs a VCO in a PLL ("phase-locked loop"), which cannot be easily implemented in commonly used digital circuits such as FPGAs ("field programmable gate arrays") or other programmable integrated circuits (ICs). An alternative is direct digital synthesis using an NCO ("numerically controlled oscillator"), which involves a DAC ("digital-to-analog converter") and an analog filter, rather than a VCO in a PLL. There are commonly available ASSP ("application-specific signal processor") chips that use these techniques. However, the cost is a significant disadvantage in terms of board space and end product price, especially if there are multiple video and audio streams to be de-embedded.

FPGAs are commonly used for processing video signals. Handling embedded audio is also a task that can conveniently be done in an FPGA. Currently, however, clock signal generation (and sometimes the signal de-embedding itself) is done by application specific standard product ("ASSP") chips external to the FPGA, at significant added cost. It would be advantageous to have the audio clock signal generation done inside the FPGA. This is possible using PLL resources of the FPGA. However, there are typically few PLLs in an FPGA, and they are often needed for other clocking tasks. Furthermore, when many channels are present, many PLLs are required, possibly more than the number available in the FPGA.

An FPGA or other programmable IC that can generate an audio clock signal from a video stream using commonly available resources would enable the design of a compact integrated circuit without the need for resource-expensive circuit elements such as PLLs, NCOs, DACs, or ASSPs. Thus, there is a need for a circuit and related method to generate an audio clock signal inside a programmable IC in a way that uses commonly available resources that avoid the disadvantages of conventional approaches.

SUMMARY

In accordance with an exemplary embodiment, a clock signal generator and a related method are provided. In an exemplary embodiment, a clock signal is produced that is a rational but non-integer submultiple of an input clock signal by employing a dithered clock signal and phase interpolation. The clock signal generator is configured to produce an output clock signal from a reference clock signal, and includes an input for receiving a rational submultiple. The rational submultiple includes an integer part and a fractional part; the fractional part includes a numerator and a denominator. The clock signal generator further includes a dithered pulse generator configured to produce a dithered pulse from a count of the reference clock signal that is reset dependent on the integer part, and a fractional phase from a count that is incremented by the numerator and that is reset dependent on the denominator. The clock signal generator further includes a phase controller configured to delay the dithered pulse by a delay proportional to the fractional phase to produce the output clock signal, wherein a frequency of the output clock signal is a frequency of the reference clock signal divided by the rational submultiple.

In an embodiment, the dithered pulse generator includes a fractional phase accumulator coupled to the reference clock signal, the fractional phase accumulator includes a register, wherein a value of the register is incremented by the numerator in response to the reference clock signal, and is decremented by the denominator to produce the fractional phase in response to a dither flag. The dithered pulse generator further includes overflow logic coupled to the fractional phase accumulator. The overflow logic asserts the dither flag when the value of the register is greater than the denominator, and outputs the fractional phase of the register in response to the dither flag. The dithered pulse generator further includes an integer clock counter configured to count pulses of the reference clock signal, and to reset the count of pulses when a value of the count of pulses equals the integer part of the rational submultiple, unless the dither flag is asserted, wherein the count of pulses is reset to zero when the count of pulses equals the integer part of the rational submultiple plus one.

In an embodiment, the phase controller includes a controlled delay line configured to delay the dithered pulse by the delay proportional to the fractional phase to produce a phased pulse, and a phase-to-taps converter configured to control a tap of the controlled delay line to set the delay proportional to the fractional phase. In an embodiment, the phase controller further includes taps-per-cycle logic coupled to the controlled delay line to measure a delay characteristic of the controlled delay line to calibrate the phase-to-taps converter.

BRIEF DESCRIPTION OF THE DRAWINGS

The details of one or more embodiments of the invention are set forth in the accompanying drawings and the description below. Other features, objects, and advantages of the invention will be apparent from the description and drawings, and from the claims. In the figures, identical reference symbols generally designate the same component parts throughout the various views, and may be described only once in the interest of brevity. For a more complete understanding of the invention, reference is now made to the following descriptions taken in conjunction with the accompanying drawings, in which:

FIG. 4 illustrates a drawing showing timing of waveforms for the process illustrated in FIGS. 2 and 3 for an exemplary clock frequency divider ratio of 3 plus ⅕, constructed according to an embodiment.

DETAILED DESCRIPTION

Figure 1:
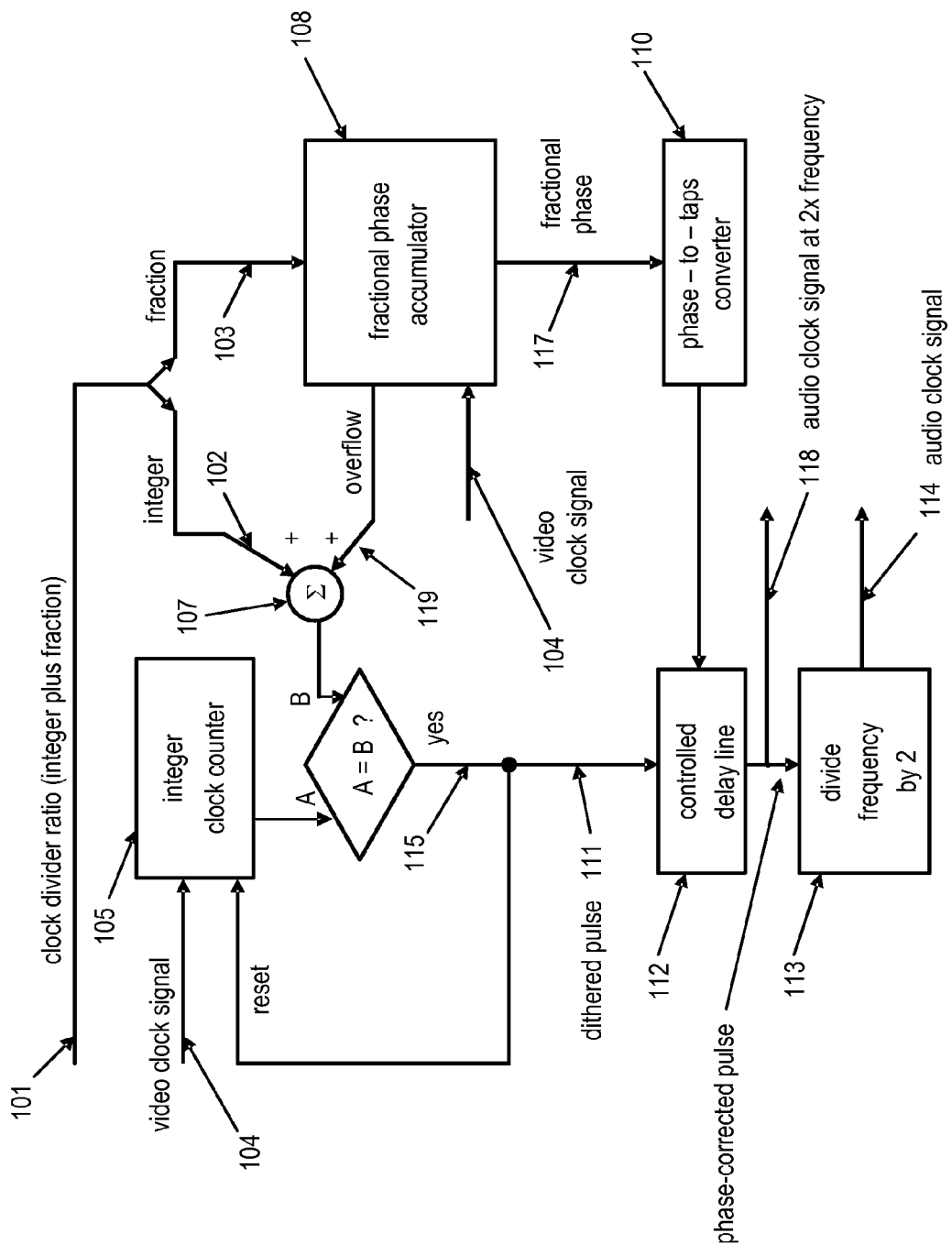
FIG. 1 illustrates a block diagram of a clock signal generator to produce a synchronized audio clock signal from a higher frequency video clock signal with a rational clock frequency divider ratio, constructed according to an embodiment.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention is described with respect to exemplary embodiments in a specific context, namely a process to generate a synchronized audio clock signal from a higher frequency signal such as a video signal wherein the frequencies of the two signals are related by a rational clock frequency divider ratio.

An embodiment of the invention may be applied to various clock signal generation arrangements, for example, to conversion of a clock signal with a higher clock frequency to a clock signal with a lower frequency, the two signals synchronized and related by a rational clock frequency divider ratio that might not be an integer ratio. Other clock-generation arrangements can be constructed and applied using processes as introduced herein in different contexts using inventive concepts described herein, for example, a clock signal generation arrangement employed to convert an internal digital clock signal, such as a 200 MHz clock signal, to the lower frequency clock signals required for audio signals contained in DVDs ("digital video disks"), such as 49.152 MHz, or the audio signals contained in CDs ("compact disks"), such as 22.5792 MHz. Both lower frequency clock signals can be obtained as a rational submultiple of a single internal digital clock signal source without the need for dedicated oscillators, such as oscillators constructed with crystal resonators.

Clock signal generation, such as for an audio pulse as introduced herein, can be divided into two major tasks: creation of a dithered pulse and phase interpolation. The resulting phase-interpolated pulse, such as an audio pulse, can optionally be further divided, for example by two, to produce an audio clock signal with a 50% duty cycle.

The concept of using a dithered pulse with phase interpolation can be applied to applications wherein a clock signal is required that can be represented with a frequency that is a rational divider ratio of the frequency of an input clock signal that might not be an integer ratio. The combination of pulse dithering and phase interpolation is employed in an exemplary embodiment to produce an audio clock signal without traditional clock-producing elements such as crystal oscillators, VCOs, or NCOs. The technique uses commonly available and easily formed FPGA elements, for example, such as look-up tables, registers, carry chains, and possibly multipliers. The advantage is the low cost to incorporate a synchronized clock generation process entirely within an FPGA or other programmable IC. Multiple copies of the audio clock generator to process a plurality of audio signals can be formed in a single FPGA, for example, with other video and audio signal processing tasks.

Turning now to FIG. 1, illustrated is a block diagram of a clock signal generator for an audio clock signal from a video clock signal, constructed according to an embodiment. The clock generation process converts a higher frequency clock signal, such as a video clock signal, into a synchronized lower frequency signal, such as an audio clock signal that is synchronized to the video clock signal. The clock frequency divider ratio is a rational number and is not restricted to be an integer number. For example, the video clock signal may have a frequency of 148.5 MHz, and the required audio clock signal may have a frequency that is the video clock frequency divided by 3 plus the fraction $87/4096$. The sum of integer part 102 plus fractional part 103 is referred to as the clock frequency divider ratio. If there is no fractional part of the clock frequency divider ratio, then synchronized frequency division can be readily performed with a digital counter that counts video clock pulses up to the specified integer clock frequency divider ratio, resets, and again counts. The fractional part of the clock frequency divider ratio introduces the difficulty.

TABLE I shows various clock frequency divider ratios for obtaining 49.152 MHz audio clock pulses for a 24.576 MHz audio clock from video clock signals produced under the HD-SDI ("high-definition serial digital interface") standard and the SMPTE ("Society of Motion Picture and Television Engineers") 424M video standard 3G-SDI. The divider ratio is represented in TABLE 1 as an integer part plus a fractional part. As also illustrated in TABLE I, to produce an audio pulse at 49.152 MHz from an HD-SDI video clock of 148.5 MHz/1.001, the integer part of the clock frequency divider ratio is 3, the fractional numerator is 849, and the fractional denominator is 46592.

TABLE I

| Video standard | Video clock rate | Integer | Fraction |
| --- | --- | --- | --- |
| HD-SDI | 148.5 MHz | 3 | 87/4096 |
| HD-SDI | 148.5 MHz/1.001 | 3 | 849/46592 |
| 3G-SDI | 297 MHz | 6 | 87/2048 |
| 3G-SDI | 297 MHz/1.001 | 6 | 849/23296 |

The generation of a synchronized audio clock signal from a higher frequency video clock signal is now described with continued reference to FIG. 1. A specified clock frequency divider ratio 101 is supplied as an input, i.e., as an integer part 102 and a fractional part 103. A fractional phase accumulator 108 increments a register therein by the specified fractional part for each video clock signal pulse on line 104. When the register in the fractional phase accumulator stores a value greater than or equal to one, an overflow signal 119 is sent to a summer block 107, and the register in the fractional phase accumulator is decremented by one, leaving a remaining fractional part in the register. (In the present specification, the same reference characters are used to refer to signal lines and their corresponding signals.)

Integer clock counter 105 contains a register that is incremented by one for each pulse of the video clock signal on line 104. When the contents A of the register in the integer clock counter 105 are equal to the contents B of a register in the summer block 107, a dithered pulse 111 is asserted, and the register in the integer clock counter 105 is reset to 0, as indicated by signal 115. The summer block 107 contains the integer part of the specified clock frequency divider ratio except during the cycle when the fractional phase accumulator asserts the overflow signal 119. In this case, the summer block 107 contains the integer part of the clock frequency divider ratio plus one.

A phase-to-taps converter 110 receives the fractional part left in the register of the fractional phase accumulator 108. This is fractional phase 117. This fractional phase determines what tap is enabled in a controlled delay line 112. For example, if the controlled delay line is formed with N taps corresponding to the period of the video clock signal, and if the fractional part left in the fractional phase accumulator is represented by the quantity "f," then the required tap number T to be enabled may be computed with the equation $$T = Rnd(f \cdot N),$$

where the function Rnd(·) represents the rounding function, i.e., the function that selects the closest integer. The parameter N need not be constrained to an integer number. For example, 9.3 taps of the delay line may correspond under a particular operating condition to the period of the video clock signal.

The phase-to-taps conversion process represented by block 110 can be implemented, for example and without limitation, with a look-up table or with computation representing the equation for T above. The conversion process need not be static, but can be adapted in real time to accommodate, for example, manufacturing process-induced and temperature-induced delay variations in the tapped delay line, as described later hereinbelow. Accordingly, the parameter N in the equation above or the lookup table can be adjusted on the fly.

Thus, the controlled delay line 112 delays the dithered pulse dithered pulse 111 according to the contents of the register in the fractional phase accumulator 108 to produce an audio clock signal 118 synchronized, with compensated delay, to the video clock signal. The amount of output jitter is related to the resolution and accuracy of the delay line, which are a function of the delay elements used. Delay elements can consist of specially designed delay primitives, or be made from other resources such as phased clocks, inverters, look-up tables, and carry chains. In many cases, the delay of the delay elements can vary due to process, voltage, and temperature of the semiconductor devices. The phase-to-tap conversion can be calibrated to account for this delay line variability as described further hereinbelow.

The "divide frequency by 2" block 113 may be optionally included to produce an audio clock signal 114 at half the frequency specified by the clock frequency divider ratio 101. Block 113 may be implemented, for example, with a T ("toggle") flip-flop. This flip-flop divides the pulse output frequency by two and, in conjunction with a higher frequency signal 118, can be used to produce an accurate 50% duty cycle for the synthesized audio clock signal as well as an audio clock signal at the specified frequency.

Frequency division as described above is thus performed in a dithered fashion. Each output clock period is at an average frequency that is exactly the video clock rate divided by the clock frequency divider ratio. The advantage of this dithering technique is that the audio clock signal remains precisely locked to the video clock signal. The process to produce a synchronized audio clock signal can be formed entirely within an FPGA, for example, and can be easily replicated for multiple video streams.

The combination of a dithered clock and phase interpolation provides substantial improvement over a system using only one or the other. Compared to PLLs, the range of fractional divider ratios is greatly increased without concern for the operating range of a VCO. In addition, the lock time for synchronization is much faster, and can to be on the order of a few clock cycles. Compared to NCOs, the described circuit does not have the potentially large sine wave look-up table or the analog filtering components that are not generally included in digital logic devices such as FPGAs. It also uses more generic and less expensive resources, such as logic gates, compared to VCOs and NCOs that are constructed with more complex semiconductor devices. Another advantage is that the phase interpolation technique used to reduce output jitter can also be used to insert a controlled jitter for testing purposes to enable measurement of the jitter tolerance of a downstream device.

Figure 2:
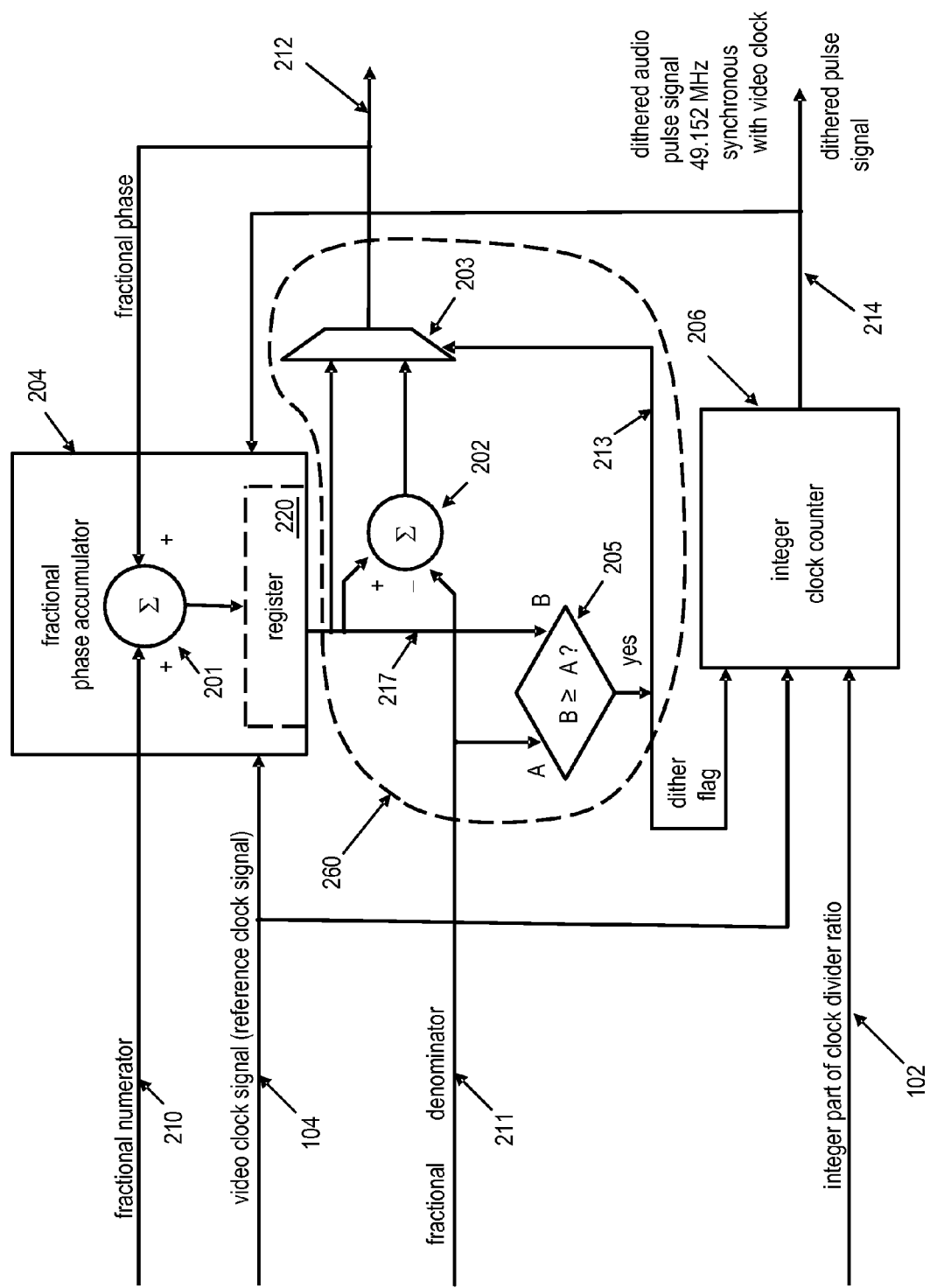
FIGS. 2 and 3 taken together illustrate a block diagram showing elements of a further embodiment to produce a synchronized audio clock signal from a video clock signal with a rational clock frequency divider ratio, constructed according to an embodiment.

Turning now to FIG. 2, illustrated is a block diagram showing elements of a further embodiment to produce a dithered audio pulse from a video clock signal, constructed according to an embodiment. FIG. 2 illustrates a dithered pulse generator that forms a portion of an audio clock signal generator, with the phase controller illustrated in FIG. 3 that is another portion. The portion illustrated in FIG. 3 includes a delay line and circuit elements that enable measurements to calibrate the conversion of fractional phase to delay line taps.

As illustrated in FIG. 2, a specified fractional numerator of a clock frequency divider ratio is supplied on line 210 to summer 201. The specified fractional denominator of the clock frequency divider ratio is supplied on line 211 to summer/subtractor 202. Fractional phase accumulator 204 contains a register 220 that, in conjunction with the logical test illustrated in block 205, is incremented by the fractional numerator of the clock frequency divider ratio fraction for each pulse of the video clock signal supplied on line 104. The register 220 in the fractional phase accumulator is incremented when its contents are less than the fractional denominator of the clock frequency divider ratio.

The dithered pulse generator includes overflow logic 260 responsive to output 217 of the fractional phase accumulator and the fractional denominator 211 that produces a fractional phase 212.

Dither flag 213 is asserted by the block 205 each time the register 220 in the fractional phase accumulator rolls over. When the output 217 of the fractional phase accumulator is greater than the fractional denominator 211 (i.e., overflow occurs), the dither flag 213 is asserted. This causes multiplexer 203 to output the result of subtracting the denominator value from the value of the register in the fractional phase accumulator 204. Thus, the fractional phase 212 is the value that is the fractional phase accumulator modulo the fractional denominator value of the value that overflowed. This value is also fed back to the summer 201 that feeds the fractional phase accumulator 204. In this way, the dither flag is asserted at exactly the ratio of the numerator divided by the dither denominator, for example, 849 times out of each 46592 audio clock signals for an exemplary fractional part of the clock frequency divider ratio of "849/46592." This produces an average frequency of the dithered audio pulse that is exactly the video clock frequency divided by the clock frequency divider ratio.

When the dither flag on line 213 is asserted to control the multiplexer 203, indicating that the contents B of the register in the fractional phase accumulator are greater than or equal to the denominator A of the clock frequency divider ratio, the fractional phase input to the summer 201 is the output 217 of the fractional phase accumulator minus the fractional denominator. For example, for a clock frequency divider ratio fraction of "⅔," the register in the fractional phase accumulator counts 2, 2+2=4, 4−3+2=3, 3−3+2=2, 2+2=4, 4−3+2=3, 3−3+2=2, etc. Thus, the summers 201 and 202 in conjunction with the multiplexer 203 and the logical test executed in block 205 enable the fractional phase accumulator 204 to accumulate in this manner the fractional clock phase at every video clock signal pulse supplied on line 104. Note that the fractional phase signal on line 212 is supplied to the circuit illustrated in FIG. 3. This signal is used to determine the amount of delay to be applied by the controlled delay line 112.

A register in integer clock counter 206 counts by one for each pulse of the video clock signal on line 104. This register is reset when its contents reach the integer part of the clock frequency divider ratio supplied on line 102. However, the level at which this register is reset is increased by one when the dither flag on line 213 is asserted. For example, when the integer part of the clock frequency divider ratio is "3," the register counts 1, 2, 3, 1, 2, 3, 4, 1, etc., where the register is enabled to count to "4" when the dither flag on line 213 is asserted. A dithered pulse is output from the integer clock counter when the register therein is reset.

The integer clock counter outputs a dithered pulse signal on line 214. If desired, this signal may be supplied at twice the frequency of the desired audio clock signal in anticipation of the use of a "divide frequency by 2" block, such as the block 113 illustrated in FIG. 1.

Figure 3:
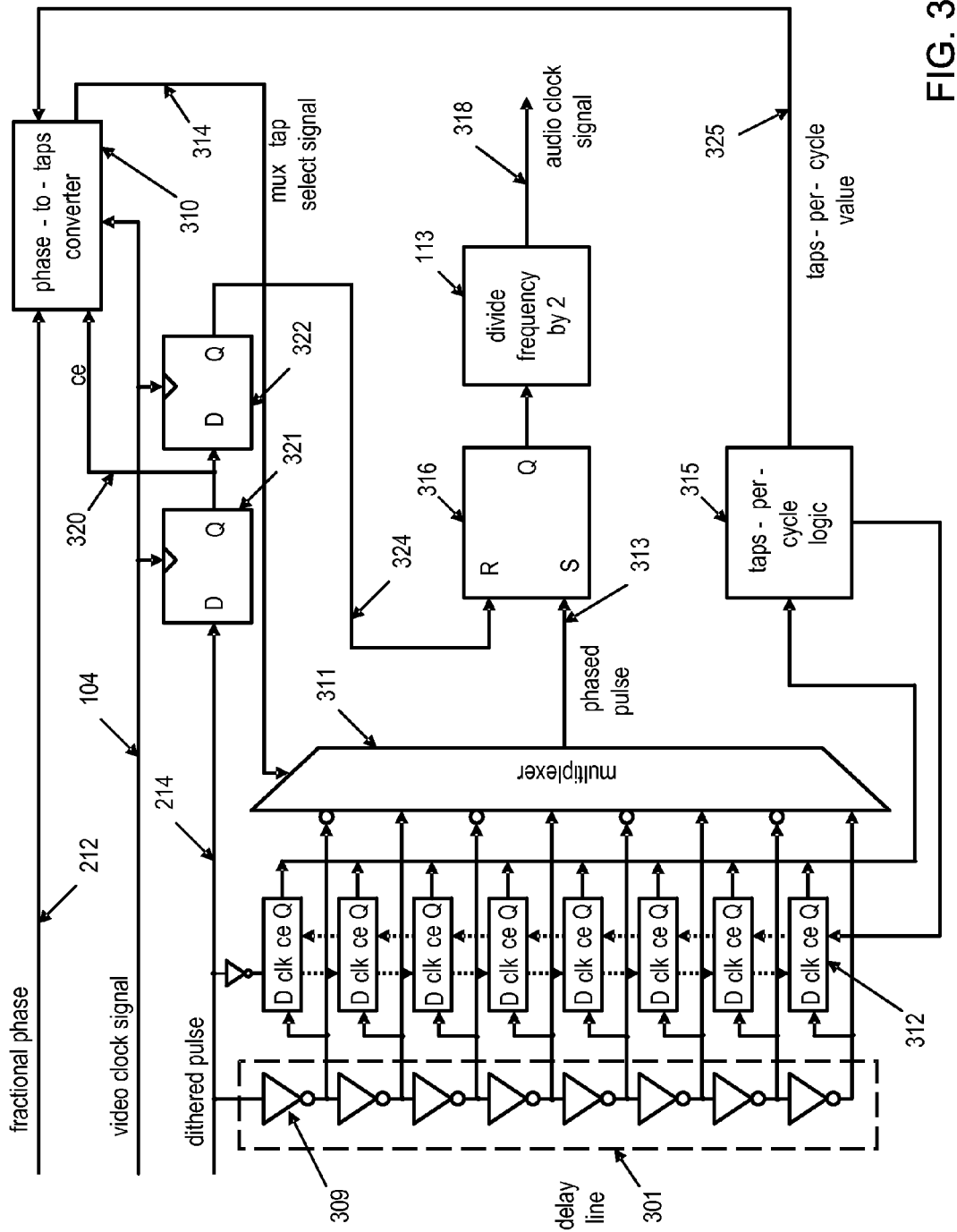

Turning now to FIG. 3, illustrated is a block diagram showing continuation of the process illustrated in FIG. 2 to produce an audio clock signal 318 as an output, constructed according to an embodiment. The circuit illustrated in FIG. 3 includes delay line calibration capability. The input signals illustrated in FIG. 3 are the fractional phase 212, the video clock signal 104, and the dithered pulse signal 214, all of which are illustrated in FIG. 2. The output audio clock signal 318 is synchronized as a specified rational submultiple of the video clock signal 104. A phase-to-taps converter 310 performs a function similar to that performed by the phase-to-tap converter 110 illustrated and described with reference to FIG. 1. Phase-to-taps converter 310 determines the number of delay line taps required to delay the dithered pulse signal 214 that is coupled to the input of delay line 301. The audio clock signal 318 is produced by set reset ("S-R") flip-flop 316 and the optional "divide frequency by 2" block 113 described previously hereinabove with reference to FIG. 1, that can be implemented with a toggle flip-flop. Delay flip-flops 321 and 322 provide a time-aligned reset signal R on line 324 for the S-R flip-flop 316 and a clock enable signal "ce" for the phase-to-taps converter 310. The set signal S for the S-R flip-flop 316 is provided by a phased pulse output signal 313 of multiplexer 311.

The delay line 301 illustrated in FIG. 3 is formed as a chain of coupled inverters, such as inverter 309, the outputs of which are coupled to flip flops, such as delay flip-flop 312, that are clocked by the falling edge of the dithered pulse signal 214. These flip-flops sample the contents of the delay line each time a dithered pulse occurs. The outputs of these flip-flops are coupled to taps-per-cycle logic block 315 that enables the inverter delays to be sensed so that the proper tap of the tapped delay line 301 can be selected by the taps-per-cycle logic block 315. This block uses the snapshot of the delay line timing captured in delay flip-flop 312 to determine the number of delay taps that equal the period of one video clock cycle. This value is used to calibrate the phase-to-taps converter 310. The combined delay of the inverters of the tapped delay line is preferably at least one and one-half video clock cycles. Preferably, the taps-per-cycle logic block 315 senses transitions of the delay line output signals, such as low-to-high transitions, or high-to-low transitions, to make timing estimates. The taps-per-cycle logic block 315 can thus take timed snapshots of the timed progression of the dithered pulse signal on line 214 through the tapped delay line, particularly by observing edges of the progression of the dithered pulse, and produce therefrom a value of the delays of the delay line elements.

The multiplexer 311, under control of the phase-to-taps converter 310, selects the output of a delay line inverter to produce the phased pulse output signal 313 at the multiplexer output that provides a set signal S to the S-R flip-flop 316.

Describing further the operation of the process illustrated in FIG. 3, the phase-to-taps converter 310 in conjunction with the taps-per-cycle logic block 315 determines which tap of the delay line is selected by the multiplexer 311. The selection is controlled by the multiplexer tap select signal 314 from the phase-to-taps converter 310. The taps-per-cycle value 325 is determined by the taps-per-cycle logic block 315 and provided to the phase-to-taps converter 310. The denominator of the fractional part of the ratio, which is essentially a constant, is also used to determine the proper delay line tap. A further equation for determining the tap is $$i = \text{Per} \cdot \text{Phase} \cdot 1/N,$$

where
  i is the instantaneous phase delay in taps,
  Per is the reference clock period in number of taps (the taps per cycle value),
  Phase is the fractional phase accumulator value, and
  N is the ratio denominator.
This calculation is performed once for each dithered pulse supplied on line 214. For many applications, these values can be approximated to simplify the calculation. For a high-resolution delay line, a high accuracy multiplier may be required, such as a dedicated multiplier in an FPGA.

As stated previously, the Per value (i.e., the video clock signal period expressed as a number of taps) can vary depending on process voltage and temperature, indicating that it can change dynamically during operation. The taps-per-cycle logic block 315 performs an auto-calibration function for the delay line to measure and compensate for such changes. Registers attached to delay line taps are used in the calibration process to sample the dithered pulse. The width of the dithered pulse is the period of one video clock signal. Thus, the period of the video clock signal expressed in taps can be determined by counting the number of taps that show the dithered pulse asserted.

The taps-per-cycle logic block 315 operates by first asserting clock enables to pulse sample registers such as delay flip-flop 312. The pulse is captured in the pulse sample registers on the falling edge of the dithered pulse, which acts as a clock. The falling edge of the dithered pulse signal 214 is used in order to allow the pulse to propagate approximately one-half a video clock signal period in the delay line, ensuring that both the rising and falling edges of the pulse are present in the sample. Therefore, the total delay of the delay line should be greater than 1.5 times the video clock signal period in terms of the shortest possible tap delays.

The sampling of the dithered pulse on line 214 can be done in parallel with the operation of phase interpolation, and does not affect operation of the delay line with respect to dithering the phase. The video clock signal period does not change rapidly, so the determination can occur in "slow time," that is, on the order of seconds or minutes. A change in the number of taps per video clock signal period will automatically be reflected in clock phasing by the calculations associated with the multiplexer logic. This is how the phase-to-taps converter is calibrated. The delay resolution must be sufficiently fine, and/or the jitter allowance must be such that the changes due to calibration are accommodated gracefully.

The clock generation operation is thus performed in two principal steps, i.e., producing a dithered pulse precisely locked to a reference clock such as a video clock signal, and refining the phase of the output clock signal by a process of interpolating the delay according to the ideal fractional position of the synthesized edge with respect to the reference clock. This process produces a low-jitter audio clock signal that is a rational submultiple of a video clock signal that is locked to the video clock signal. The process can be performed entirely within an FPGA, for example, without consumption of any PLLs, DLLs (delay-locked loops) or other limited and valuable clocking resources.

Turning now to FIG. 4, illustrated is a drawing showing timing for the process and circuit illustrated in FIGS. 2 and 3 for a clock frequency divider ratio of 3 plus ⅕, constructed according to an exemplary embodiment. A top waveform 401 illustrated in FIG. 4 shows a reference clock signal such as a video clock signal 104. A next waveform, 402, illustrates the dithered clock signal 214 illustrated in FIGS. 2 and 3, which is a sequence of pulses with a period that varies by an integer number of reference (video) clock pulses. Below that, waveform 403 illustrates the phased pulse output signal 313 illustrated in FIG. 3. Waveform 404 illustrates the Q output of the S-R flip-flop 316. Waveform 405 is the synthesized audio clock signal produced by the T flip-flop in block 113. Waveform 406 is the signal 320 produced by the delay flip-flop 321. Waveform 407 is the input signal 314 to the multiplexer 311. The last waveform, 408, is the reset input signal R to the S-R flip-flop 316.

Since the multiplexer 311 is dynamically controlled, there is a possibility of a small timing discontinuity in the phased pulse output signal 313 when the multiplexer tap select signal 314 is changed, as illustrated by the arrows 410 in FIG. 4. The reset signal R of the S-R flip-flop 316 masks such small discontinuities in the audio clock signal 318. This is done by allowing the multiplexer select to change only when reset of the flip-flop is asserted (R ("reset") has priority over S ("set") in this implementation). Thus, the timing of the rising-edge of the S-R flip-flop output is determined by the phased pulse. The timing of the falling edge is determined by the S-R reset line that changes on the falling edge of the reference clock.

As stated above, the method of producing a clock using dithered clock and phase interpolation can also be employed to insert jitter into a signal for testing purposes. Jitter can be inserted into a signal by adding an offset to the fractional phase in the phase interpolation process. The magnitude and frequency of this offset determine the magnitude and frequency of the resulting jitter. For jitter larger than one reference clock period in magnitude, an offset can also be added to the clock frequency divider ratio of the dither pulse section. Thus, jitter, defined as an integer and a fractional number of reference clock cycles, can be modulated onto the output clock signal.

The concept has thus been introduced of producing a clock signal that is a rational but non-integer submultiple of an input clock signal by employing a dithered clock signal and phase interpolation. In an embodiment, a clock signal generator is configured to produce an output clock signal from a reference clock signal. The clock signal generator includes an input for receiving a rational submultiple. The rational submultiple includes an integer part and a fractional part, and the fractional part includes a numerator and a denominator. The clock signal generator further includes a dithered pulse generator configured to produce a dithered pulse from a count of the reference clock signal that is reset dependent on the integer part, and a fractional phase from a count that is incremented by the numerator and that is reset dependent on the denominator. The clock signal generator further includes a phase controller configured to delay the dithered pulse by a delay proportional to the fractional phase to produce the output clock signal, wherein a frequency of the output clock signal is a frequency of the reference clock signal divided by the rational submultiple.

In an embodiment, the dithered pulse generator includes a fractional phase accumulator coupled to the reference clock signal. The fractional phase accumulator includes a register, wherein a value of the register is incremented by the numerator in response to the reference clock signal, and is decremented by the denominator to produce the fractional phase in response to a dither flag. The dithered pulse generator further includes overflow logic coupled to the fractional phase accumulator. The overflow logic includes a comparator configured to assert the dither flag when the value of the register is greater than the denominator, and a multiplexer configured to output the fractional phase of the register in response to the dither flag. The dithered pulse generator further includes an integer clock counter configured to count pulses of the reference clock signal, and to reset the count of pulses when a value of the count of pulses equals the integer part of the rational submultiple, unless the dither flag is asserted, wherein the count of pulses is reset to zero when the count of pulses equals the integer part of the rational submultiple plus one.

In an embodiment, the phase controller includes a controlled delay line configured to delay the dithered pulse by the delay proportional to the fractional phase to produce a phased pulse, and a phase-to-taps converter configured to control a tap of the controlled delay line to set the delay proportional to the fractional phase. The clock signal generator further includes a set-reset flip-flop with a first input coupled to the phased pulse and a second input coupled to the dithered pulse to produce the output clock signal. In an embodiment, the phase controller further includes a toggle flip-flop coupled to an output of the set-reset flip-flop to produce the output clock signal. In an embodiment, the phase controller further includes a multiplexer coupled to the controlled delay line and to the phase-to-taps converter to select a tap of the controlled delay line to produce the phased pulse. In an embodiment, the phase controller further includes taps-per-cycle logic coupled to the controlled delay line to measure a delay characteristic of the controlled delay line to calibrate the phase-to-taps converter. In an embodiment, the taps-per-cycle logic senses a signal transition of the controlled delay line to measure the delay characteristic. In an embodiment, the phase controller further includes a delay flip-flop with a first input coupled to the dithered pulse and a second input coupled to the reference clock signal and with an output coupled to the second input of the set-reset flip-flop. In an embodiment, the delay flip-flop provides further time alignment for the phased pulse by holding the set-reset flip-flop in a reset state during the period of time when the multiplexer tap select signal 314 changes. In an embodiment, the controlled delay line includes a chain of coupled inverters. In an embodiment, the controlled delay line includes a chain of self-calibrating fixed delay elements. In an embodiment, the reference clock signal is a video clock signal and the output clock signal is an audio clock signal. In an embodiment, the clock signal generator is constructed in a field programmable gate array.

Another exemplary embodiment provides a method of generating an output clock signal from a reference clock signal. In an embodiment, the method includes representing a frequency of the clock signal as a rational submultiple of the reference clock signal, the rational submultiple including an integer part and a fractional part. The fractional part includes a numerator and a denominator. In an embodiment, the method further includes producing a dithered pulse from a first count, wherein the first count is incremented in response to the reference clock signal, and wherein the first count is reset to zero when the first count is greater than or equal to a value dependent on the integer part. The method further includes producing a fractional phase from a second count, wherein the second count is incremented by the numerator in response to the reference clock signal, and wherein the second count is decremented by the denominator when the second count is greater than or equal to a value dependent on the denominator. The method further includes delaying the dithered pulse by a delay proportional to the fractional phase to produce the output clock signal.

In an embodiment, the method further includes asserting a dither flag when the second count is greater than or equal to the denominator, and setting the fractional phase equal to the second count after the fractional phase is decremented by the denominator in response to the dither flag. The method further includes resetting the first count when a value of the first count equals the integer part of the rational submultiple when the dither flag is not asserted, and resetting the first count to zero when the first count equals the integer part of the rational submultiple plus one when the dither flag is asserted.

In an embodiment, the method further includes selecting a tap of a controlled delay line to delay the dithered pulse by the delay proportional to the fractional phase to produce a phased pulse, and coupling the phased pulse to a first input of a set-reset flip-flop and coupling the dithered pulse to a second input of the set-reset flip-flop to produce the output clock signal. In an embodiment, the method further includes coupling a toggle flip-flop to an output of the set-reset flip-flop to produce the output clock signal. In an embodiment, the method further includes selecting the tap of the controlled delay line with a multiplexer coupled to the dithered pulse, to the reference clock signal, and to the fractional phase to produce the phased pulse. In an embodiment, the method further includes measuring a delay characteristic of the controlled delay line to calibrate the selection of the tap of the controlled delay line. In an embodiment, the method further includes sensing a signal transition of the controlled delay line to measure the delay characteristic. In an embodiment, the method further includes holding the set-reset flip-flop in a reset state when the tap of the controlled delay line changes by coupling a first input of a delay flip-flop to the dithered pulse, a second input of the delay flip-flop to the reference clock signal, and an output of the delay flip-flop to the second input of the set-reset flip-flop. In an embodiment, the method further includes forming the controlled delay line with a chain of self-calibrating fixed delay elements. In an embodiment, the reference clock signal is a video clock signal and the output clock signal is an audio clock signal. In an embodiment, the method further includes generating the output clock signal from the reference clock signal in a field programmable gate array.

Although processes for producing an audio clock signal that is a rational submultiple that might not be an integer submultiple of an input clock signal and related methods have been described for video signaling applications, it should be understood that other applications of these processes such as for converting video formats between international standards are contemplated within the broad scope of the invention, and need not be limited to audio clock signal generation applications employing processes introduced herein.

Although the invention has been shown and described primarily in connection with specific exemplary embodiments, it should be understood by those skilled in the art that diverse changes in the configuration and the details thereof can be made without departing from the essence and scope of the invention as defined by the claims below. The scope of the invention is therefore determined by the appended claims, and the intention is for all alterations that lie within the range of the meaning and the range of equivalence of the claims to be encompassed by the claims.

What is claimed is:

1. A clock signal generator configured to produce an output clock signal from a reference clock signal, the clock signal generator comprising:
   an input for receiving a rational submultiple, the rational submultiple comprising an integer part and a fractional part;
   a dithered pulse generator configured to produce
      a dithered pulse from a count of the reference clock signal that is reset dependent on the integer part, and
      a fractional phase from a count that is incremented by the fractional part and that is decremented dependent on an accumulated value of the fractional part; and
   a phase controller configured to delay the dithered pulse by a delay proportional to the fractional phase to produce the output clock signal,
   wherein a frequency of the output clock signal is a frequency of the reference clock signal divided by the rational submultiple.

2. The clock signal generator as claimed in claim 1, wherein the dithered pulse generator comprises:
   a fractional phase accumulator coupled to the reference clock signal, the fractional phase accumulator comprising a register, wherein a value of the register
      is incremented by the numerator in response to the reference clock signal, and
      is decremented by the denominator to produce the fractional phase when the value of the register is greater than the denominator;
   overflow logic coupled to the fractional phase accumulator, the overflow logic comprising a multiplexer configured to output the fractional phase of the register when the value of the register has exceeded the denominator; and
   an integer clock counter configured
      to count pulses of the reference clock signal, and
      to reset the count of pulses to zero when a value of the count of pulses equals the integer part of the rational submultiple, unless the value of the register has exceeded the denominator, wherein the count of pulses is reset to zero when the count of pulses equals the integer part of the rational submultiple plus 1.

3. The clock signal generator as claimed in claim 1, wherein the phase controller comprises:
   a controlled delay line configured to delay the dithered pulse by the delay proportional to the fractional phase to produce a phased pulse;
   a phase-to-taps converter configured to control a tap of the controlled delay line to set the delay proportional to the fractional phase; and
   a set-reset flip-flop with a first input coupled to receive the phased pulse and a second input coupled to receive the dithered pulse to produce the output clock signal.

4. The clock signal generator as claimed in claim 3, wherein the phase controller further comprises a toggle flip-flop coupled to an output of the set-reset flip-flop to produce the output clock signal.

5. The clock signal generator as claimed in claim 3, wherein the phase controller further comprises a multiplexer coupled to the controlled delay line and to the phase-to-taps converter to select a tap of the controlled delay line to produce the phased pulse.

6. The clock signal generator as claimed in claim 3, wherein the phase controller further comprises taps-per-cycle logic coupled to the controlled delay line to measure a delay characteristic of the controlled delay line to calibrate the phase-to-taps converter.

7. The clock signal generator as claimed in claim 3, wherein the phase controller further comprises a delay flip-flop with a first input coupled to the dithered pulse, a second input coupled to the reference clock signal, and an output coupled to the second input of the set-reset flip-flop.

8. The clock signal generator as claimed in claim 3, wherein the controlled delay line comprises a chain of coupled inverters.

9. The clock signal generator as claimed in claim 1, wherein the reference clock signal is a video clock signal and the output clock signal is an audio clock signal.

10. The clock signal generator as claimed in claim 1, wherein the clock signal generator is constructed in a programmable integrated circuit.

11. The clock signal generator as claimed in claim 1, wherein the count is decremented by one dependent on the accumulated value of the fractional part exceeding one.

12. The clock signal generator as claimed in claim 1, wherein the fractional part comprises a numerator and a denominator.

13. A method of generating an output clock signal from a reference clock signal, the method comprising:
representing a frequency of the output clock signal as a rational submultiple of the reference clock signal, the rational submultiple comprising an integer part and a fractional part, the fractional part comprising a numerator and a denominator;
producing a dithered pulse from a first count, wherein the first count is incremented in response to the reference clock signal, and wherein the first count is reset to zero when the first count is greater than or equal to a value dependent on the integer part;
producing a fractional phase from a second count, wherein the second count is incremented by the numerator in response to the reference clock signal, and wherein the second count is decremented by the denominator when the second count is greater than or equal to a value dependent on the denominator; and
delaying the dithered pulse by a delay proportional to the fractional phase to produce the output clock signal.

14. The method as claimed in claim 13, further comprising:
asserting a dither flag when the second count is greater than or equal to the denominator, and setting the fractional phase equal to the second count after the fractional phase is decremented by the denominator in response to the dither flag; and
resetting the first count when a value of the first count equals the integer part of the rational submultiple when the dither flag is not asserted, and resetting the first count to zero when the first count equals the integer part of the rational submultiple plus 1 when the dither flag is asserted.

15. The method as claimed in claim 14, further comprising:
selecting a tap of a controlled delay line to delay the dithered pulse by the delay proportional to the fractional phase to produce a phased pulse; and
coupling the phased pulse to a first input of a set-reset flip-flop and coupling the dithered pulse to a second input of the set-reset flip-flop to produce the output clock signal.

16. The method as claimed in claim 15, further comprising coupling a toggle flip-flop to an output of the set-reset flip-flop to produce the output clock signal.

17. The method as claimed in claim 15, further comprising selecting the tap of the controlled delay line with a multiplexer coupled to the dithered pulse, to the reference clock signal, and to the fractional phase to produce the phased pulse.

18. The method as claimed in claim 15, further comprising measuring a delay characteristic of the controlled delay line to calibrate the selection of the tap of the controlled delay line.

19. The method as claimed in claim 15, further comprising holding the set-reset flip-flop in a reset state when the tap of the controlled delay line changes by coupling
a first input of a delay flip-flop to the dithered pulse;
a second input of the delay flip-flop to the reference clock signal; and
an output of the delay flip-flop to the second input of the set-reset flip-flop.

20. The method as claimed in claim 15, further comprising forming the controlled delay line with a chain of self-calibrating fixed delay elements.

21. The method as claimed in claim 13, wherein the reference clock signal is a video clock signal and the output clock signal is an audio clock signal.

22. The method as claimed in claim 13, further comprising generating the output clock signal from the reference clock signal in a programmable integrated circuit.

* * * * *